(12) United States Patent
Kirstein

(10) Patent No.: US 6,978,186 B2
(45) Date of Patent: Dec. 20, 2005

(54) MODULAR FUNCTIONAL BLOCK FOR AN ELECTRONIC CONTROL SYSTEM

(75) Inventor: Robert F. Kirstein, San Diego, CA (US)

(73) Assignee: International Rectifier Corporation, El Segundo, CA (US)

(*) Notice: Subject to any disclaimer, the term of this patent is extended or adjusted under 35 U.S.C. 154(b) by 175 days.

(21) Appl. No.: 10/392,675

(22) Filed: Mar. 20, 2003

(65) Prior Publication Data
US 2004/0027254 A9    Feb. 12, 2004

Related U.S. Application Data

(60) Provisional application No. 60/366,866, filed on Mar. 22, 2002.

(51) Int. Cl.$^7$ .............................................. G05B 11/01
(52) U.S. Cl. ............................. 700/17; 700/4; 700/18; 700/15; 700/72; 700/83; 700/86; 700/105; 700/19
(58) Field of Search ................................. 700/17–19, 4, 700/83, 86, 15, 72, 105

(56) References Cited

U.S. PATENT DOCUMENTS 5,774,368 A * 6/1998 Chen et al. .................... 716/7
6,594,530 B1 * 7/2003 Glanzer et al. ................ 700/18
6,594,810 B1 * 7/2003 Reblewski et al. ........... 716/12

* cited by examiner

Primary Examiner—Anthony Knight
Assistant Examiner—Ronald D Hartman, Jr.
(74) Attorney, Agent, or Firm—Ostrolenk, Faber, Gerb & Soffen, LLP

(57) ABSTRACT

An electronic control system, such as a field oriented control system, is provided, including a device to be controlled; an application control arrangement including a plurality of functional blocks configured to perform a cascaded computation, the application control arrangement configured to generate control signals to control the device in accordance with the cascaded computation; and a master control arrangement communicatively coupled to the application control arrangement and configured to communicate parameter inputs and an initial start pulse to the application control arrangement, the initial start pulse being operable to initiate the cascaded computation; wherein each of the functional blocks is configured to generate output data and a done pulse in accordance with a predetermined partial computation, the output data being valid and stable at least for a duration of the done pulse, the predetermined partial computation of each of the functional blocks being performed as a function of input data and an input done pulse communicated by at least one input functional block, the predetermined partial computation being initiated by the input done pulse.

14 Claims, 12 Drawing Sheets

MODULAR FUNCTIONAL BLOCK FOR AN ELECTRONIC CONTROL SYSTEM

RELATED APPLICATIONS

The present application is based on and claims the benefit of U.S. Provisional Application No. 60/366,886, filed on Mar. 22, 2002, entitled "COMPUTATIONAL STRUCTURES WITH OPTIMIZED HANDSHAKING," the entire contents of which are expressly incorporated herein by reference.

FIELD OF THE INVENTION

The present invention relates to a modular functional block for use in an electronic control system (e.g., a field oriented control system) and a method for providing electronic control of a device to be controlled.

BACKGROUND OF THE INVENTION

A conventional sampled-data feedback control system, as shown in FIG. 9, may employ sampled sensor data to control an actuator to produce a desired system response. The control system typically implements an application dependent control algorithm, which involves performing calculations on the sample data to produce an output command before the next data sample period.

In various conventional motor control applications, digital signal processors (DSPs) and/or microcontrollers are used to implement control functions, such as digital motor control functions. These implemented control functions may include, for example, field oriented control of induction machines and permanent magnet synchronous machines, AC inverter drives, and high performance servo drives. The software to control these conventional implementations is generally interrupt driven, not completely deterministic in terms of expected input/output, and fixed in computational structure.

The above-described control functions (e.g., motor control functions) may be implemented in one microcontroller, with high speed computational tasks being performed by an Application Specific Integrated Circuit (ASIC). The high speed computational tasks performed by the ASIC may include, for example, pulse width modulated (PWM) waveform generation, encoder signal interface, coordinated transformation, proportional-plus-integral (PID) control, etc.

ASICs are advantageous for use in control applications, since their availability and design flexibility make possible the high computational speeds required for the tasks of various control functions, such as motor control functions. However, since the computational speed of ASICs is limited, ASIC design solutions may not be optimal for today's control applications, which require ever increasing performance and flexibility.

In situations in which a DSP and/or ASIC does not have the necessary computational speed to perform a required task, it is known to divide computational tasks among various DSPs and/or microcontrollers. For example, one DSP or microcontroller may perform torque control, whereas another DSP or microcontroller may perform other functions, such as controlling various parameters in the digital control application. However, by separating functionality among various DSPs and/or microcontrollers, control circuit designs (e.g., motor control circuit designs) may require complex interconnectivity and signaling between various components, thereby increasing design time and dollar cost.

To avoid complex interconnectivity and signaling between various components, it is known to provide additional and/or supplemental functionality in software. However, it is believed that the time and cost of developing application-specific software results in a developmental process that is slower and less cost-efficient. Furthermore, as the complexity of required software increases, the man-hour resources required to program such software increase exponentially, especially for designs requiring that the programming effort be divided among various individuals. Often, specific skills and techniques are required to ensure that the software performs with the computational speed required. Such skills and techniques, while streamlining speed of software code execution, often require additional cost for code maintainability, and often must be implemented in native assembly language to achieve the required computational speed. As a result, a high level language such as C is typically avoided, thereby contributing to a lack of code maintainability.

SUMMARY OF THE INVENTION

It is an object of the present invention to provide an electronic control system (e.g., a field oriented control system) and method by which the above disadvantages may be avoided. To achieve this object, the present invention provides modularized hardware control blocks, which are cascaded together using a unique method of interface handshaking (i.e., "Handshake-on-Terminate" methodology). This "Handshake-on-Terminate" methodology permits the electronic control system to achieve very high speed control, for example, torque control, typically on the order of less than a few microseconds. For example, a typical control block may execute in less than two microseconds. Since operations of the present invention are modularized, a number of computational tasks may be executed in parallel to eliminate the need for sequential execution of programmed instructions. The increase in computational power provided by the present invention eliminates the linear bottleneck of a sequential program employing attendant communication signals to control information exchange between various processing modules.

Unlike conventional control applications, the present invention employs neither a central processing mechanism nor a state machine, in which register sets are written to or overwritten during the course of loop execution. Rather, in accordance with the "Handshake-on-Terminate" methodology of the present invention, data cascades through the control system by flowing from one module to another, coordinated with "Handshake-on-Terminate" pulses (i.e., done pulses indicating that respective modules have completed predetermined computations).

With the "Handshake-on-Terminate" methodology, an entire cascaded electronic control loop may be initiated with a single start pulse, which may, for example, be synchronized with a digital data acquisition rate assigned to the particular motor control application. For example, the initiating start pulse may be synchronized with the sampling rate of a given parameter of the electronic control system.

The "Handshake-on-Terminate" methodology also permits a field oriented control system to be arranged in N parallel paths, with N depending on the gate count available for a particular application (e.g., the gate count available on a control IC or FPGA or ASIC). In effect, the present invention permits N parallel digital hardware controllers to operate simultaneously.

Furthermore, since the initiating start pulse is synchronized with acquisition of digital feedback data and cascaded throughout the entire control system, the initiating start pulse may be compressed or expanded at will, without impacting the performance of the electronic control system.

Accordingly, a lower bound of the sampling period (as well as a lower bound for pulse width) may be determined in accordance with a functional block having the longest latency time to output (i.e., in accordance with the time it takes for the slowest functional block to produce a valid output). In this manner, the maximum data throughput rate is determined solely by the speed of the synthesized digital hardware.

DETAILED DESCRIPTION

Figure 1:
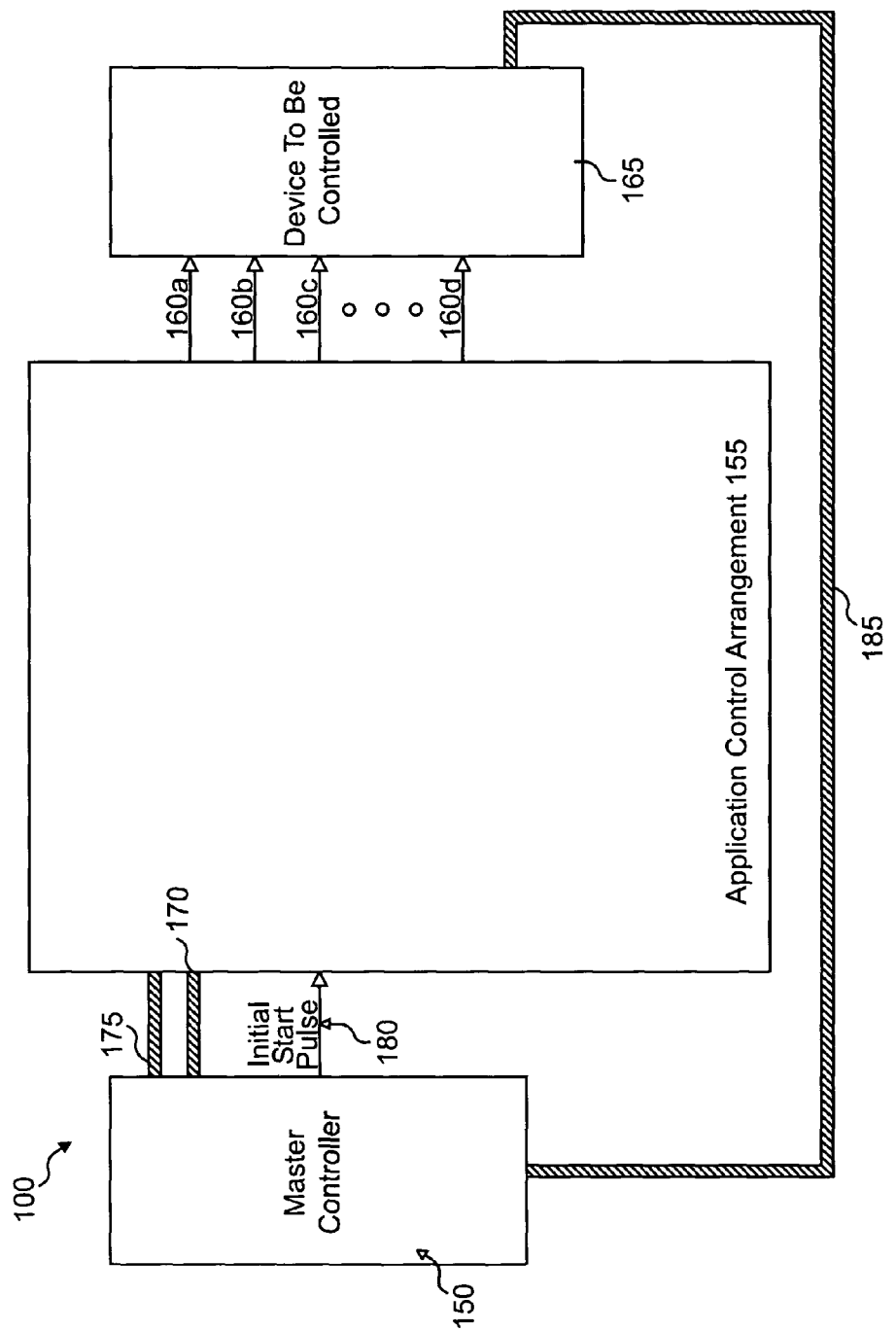
FIG. 1 is a block diagram of an exemplary electronic control system according to the present invention.

Referring now to FIG. 1, there is seen an exemplary electronic control system 100 according to the present invention. Control system 100 includes a master controller 150, an application control arrangement 155 communicatively coupled to the master controller 150 and configured to provide control signals 160a, 160b, 160c, . . . , 160n to a device to be controlled 165.

The master controller 150 includes circuitry configured to cause the application control arrangement 155 to initiate a high-speed cascaded computation to control the device to be controlled 165 via the control signals 160a, 160b, 160c, . . . , 160n. For this purpose, the master controller 150 communicates parameter inputs 170 (static and/or dynamic parameters) and initial data 175 to the application control arrangement 155, which performs the high-speed cascaded computation in accordance with the parameter inputs 170 and the initial data 175. The master controller 150 also communicates an initial start pulse 180 to the application control arrangement 155 to initiate the cascaded computation.

The master controller 150 is also operable to monitor at least one feedback parameter 185 from the device to be controlled 165. For example, if the device to be controlled includes a motor, the feedback parameter 185 may include, for example, a sensed speed of the motor, a sensed torque of the motor, a sensed temperature of the motor, etc. In this manner, the master controller 150 may, for example, modify the initial data 175 and/or the parameter inputs 170 in response to changing feedback parameters 185, thereby causing the application control arrangement 155 to control the device to be controlled 165 in accordance with the feedback parameters 185.

Figure 2:
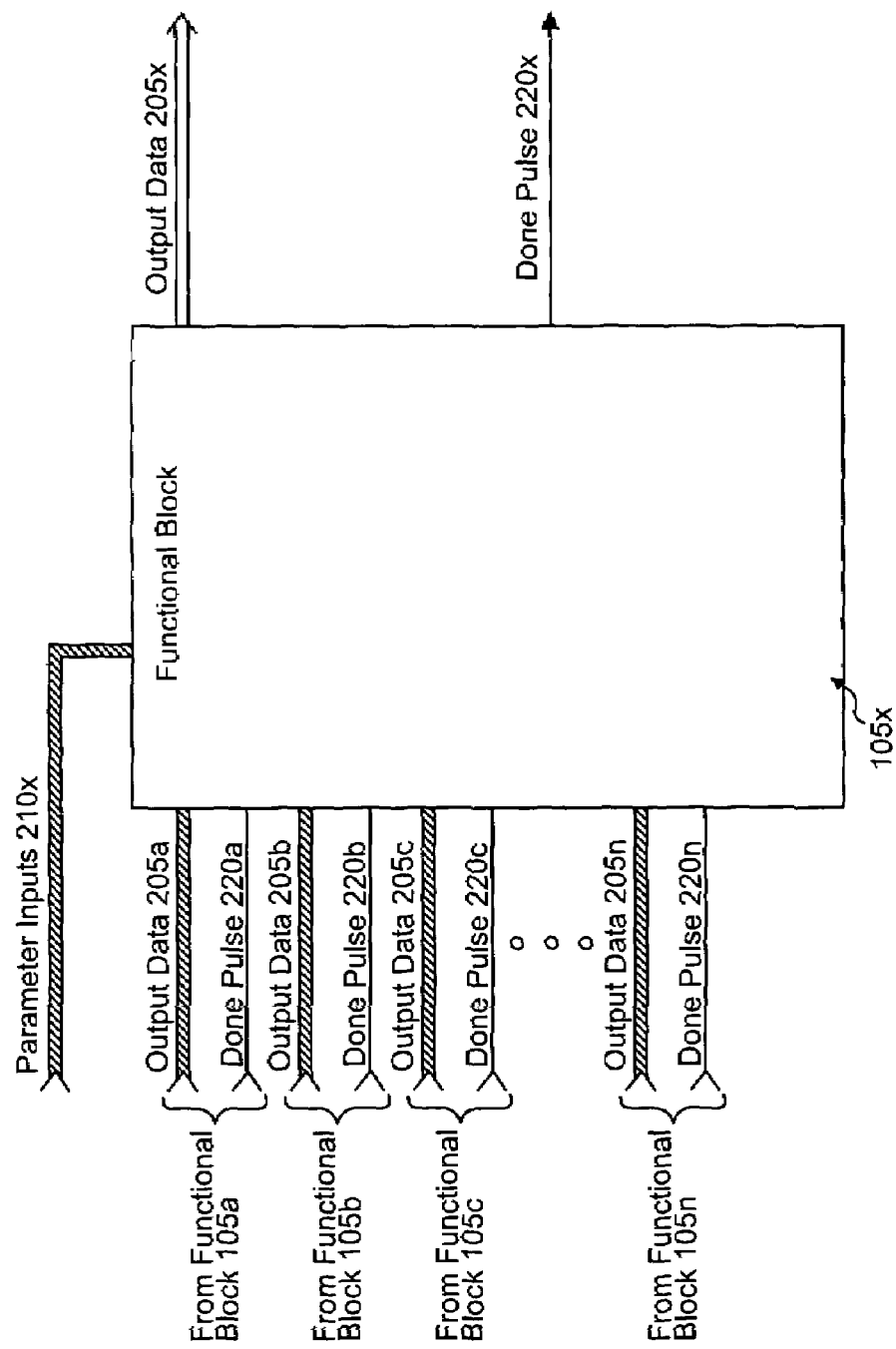
FIG. 2 is a block diagram of an exemplary functional block according to the present invention.

The application control arrangement 155 includes a plurality of functional blocks 105a, 105b, 105c, . . . , 105n (not shown) acting in unison to perform the high-speed cascaded computation. Referring now to FIG. 2, there is seen greater detail of an exemplary functional block 105x according to the present invention. Functional block 105x is configured to perform a predefined partial computation to produce an output data 205x and a done pulse 220x to be communicated to one or more of the remaining functional blocks 105a, 105b, 105c, . . . , 105n of the control arrangement 155. The predefined partial computation of the functional block 105x is performed in accordance with various inputs, which may include, for example, at least a portion of the parameter inputs 170, at least a portion of the initial data 175, and/or output data 205a, 205b, 205c, . . . , 205n and start pulses 220a, 220b, 220c, . . . , 220n from at least one other functional block 105a, 105b, 105c, . . . , 105n.

It should be appreciated that the static parameters of the parameter inputs 170, which do not change during the computation of the functional block 105x, need not be latched into a localized memory (not shown) and, in this manner, may be directly communicated to the computational hardware and/or software of the functional block 105x. In contrast, dynamically changing parameters of the parameter inputs 170 may be, for example, appropriately latched into a localized memory (not shown) of the functional block 105x, before being provided to the computational hardware and/or software of the functional block 105x.

The functional block 105x is configured to initiate its predefined partial computation and generate the output data 205x once it receives valid output data 205a, 205b, 205c, . . . , 205n from the respective functional blocks 105a, 105b, 105c, . . . , 105n, to which the inputs of the functional block 105x are connected. The output data 205x includes resultant information from the partial computation performed by the functional block 105x. The output data 205x may be communicated to at least one other functional block 105a, 105b, 105c, . . . , 105n and/or may be communicated as at least one of the control signals 160a, 160b, 160c, . . . , 160n for controlling the device to be controlled 165, if the functional block 105x is a final downstream functional block of the control arrangement 155.

The output data 205a, 205b, 205c, . . . , 205n and start pulses 220a, 220b, 220c, . . . , 220n are communicated to the functional block 105x by other functional blocks 105a, 105b, 105c, . . . , 105n. The output data 205a, 205b, 205c, . . . , 205n include the resultant information from partial computations performed by respective functional blocks 105a, 105b, 105c, . . . , 105n, and the output data 205a, 205b, 205c, . . . , 205n may remain valid and stable for the duration of the respective start pulses 220a, 220b, 220c, . . . , 220n.

The done pulse 220x signifies the completion of the partial computation of the functional block 105x and, in this manner, indicates the validity of the output data 205x. The output data 205x may remain stable and valid for the duration of the done pulse 220x, which may serve as at least one start pulse for a downstream functional block 105a, 105b, 105c, . . . , 105n.

Figure 4:
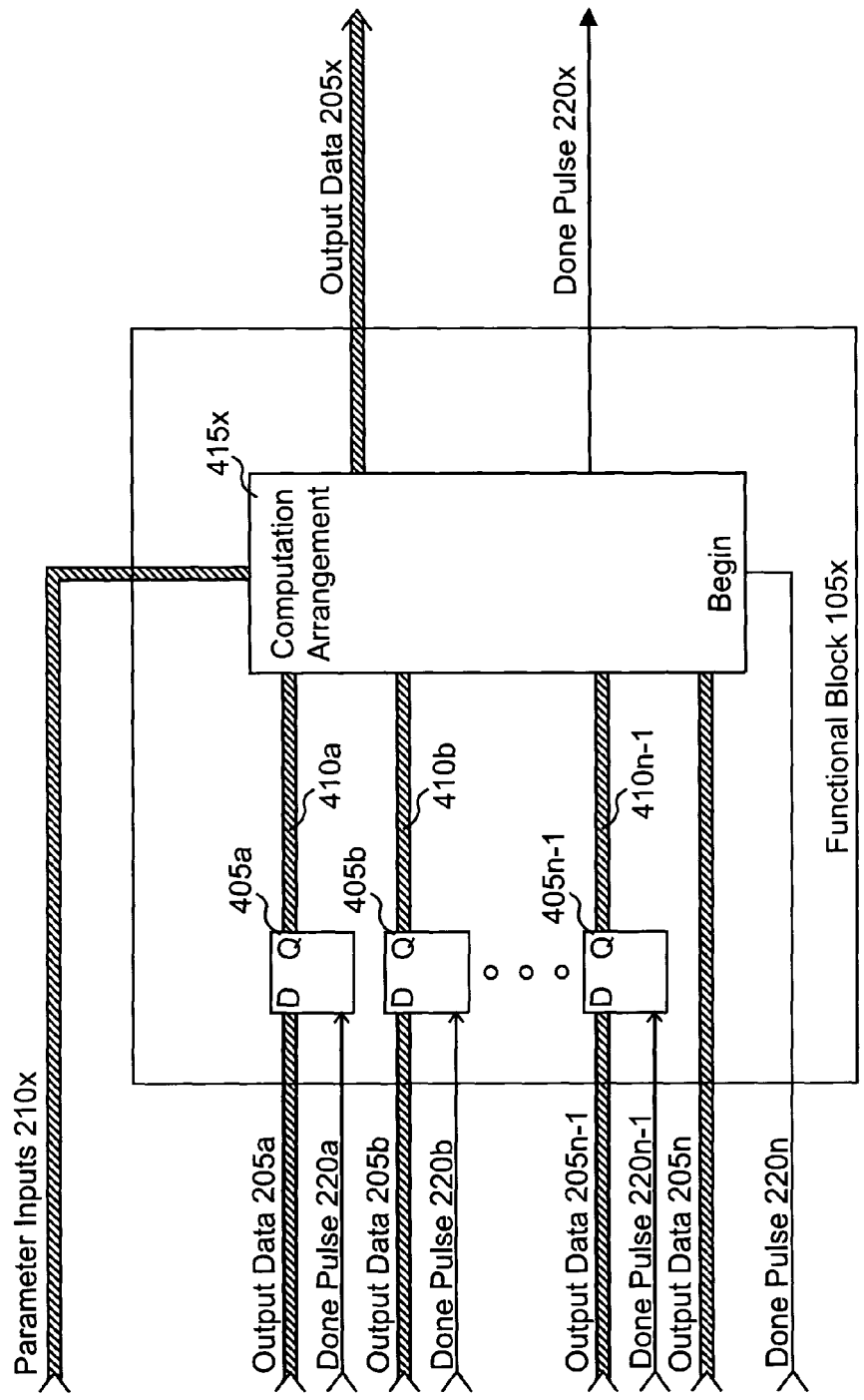
FIG. 4 is a block diagram of yet another exemplary functional block according to the present invention.

Referring now to FIG. 4, there is seen further detail of the exemplary functional block 105x shown in FIG. 2 configured to initiate a predefined partial computation after receiving valid input data from at least one other functional block 105a, 105b, 105c, . . . , 105n. As shown in FIG. 4, functional block 105x includes (n−1) latched memory banks 405a, 405b, 405c, . . . , 405n−1 to store the output data 205a, 205b, 205c, . . . , 205n−1 communicated by functional blocks 105a, 105b, 105c, . . . , 105n−1. The latched outputs 405a, 405b, 405c, . . . , 410n−1 of the latched memory banks 405a, 405b, 405c, . . . , 405n−1 are communicated to a computational arrangement 415x, which is configured to perform the predetermined partial computation of the functional block 105x for producing the output data 205x and the done pulse 220x. The computational arrangement 415x also receives unlatched output data 205n, done pulse 220n, and parameter inputs 210x.

In the exemplary embodiment shown in FIG. 4, the nth output data 205n communicated to the functional block 105x is chosen to be the output data with the largest latency time, as compared to the other output data 205a, 205b, 205c, . . . , 205n−1 (i.e., the nth output data 205n is chosen, such that it is the last valid input communicated to functional block 105x). Thus, it is ensured that the done pulse 220n communicated by functional block 105n is the last done pulse to be asserted for a given computational cycle. In this manner, it may be ensured that the latched memory banks 405a, 405b, 405c, . . . , 405n−1 latch valid and stable output data 205a, 205b, 205c, . . . , 205n−1 to the latched outputs 410a, 410b, 410c, . . . , 410n−1 before the done pulse 220n is asserted.

The done pulse 220n is operable to cause the computation arrangement 415x to initiate the predetermined partial computation in accordance with the latched output data 205a, 205b, 205c, . . . , 205n−1, the unlatched output data 205n, and the parameter inputs 210x. Once the computational arrangement 415x completes the predetermined partial computation, the arrangement 415x generates the output data 205x and the done pulse 220x, which may, for example, be communicated to at least one other downstream functional block 105a, 105b, 105c, . . . , 105n.

Figure 5:
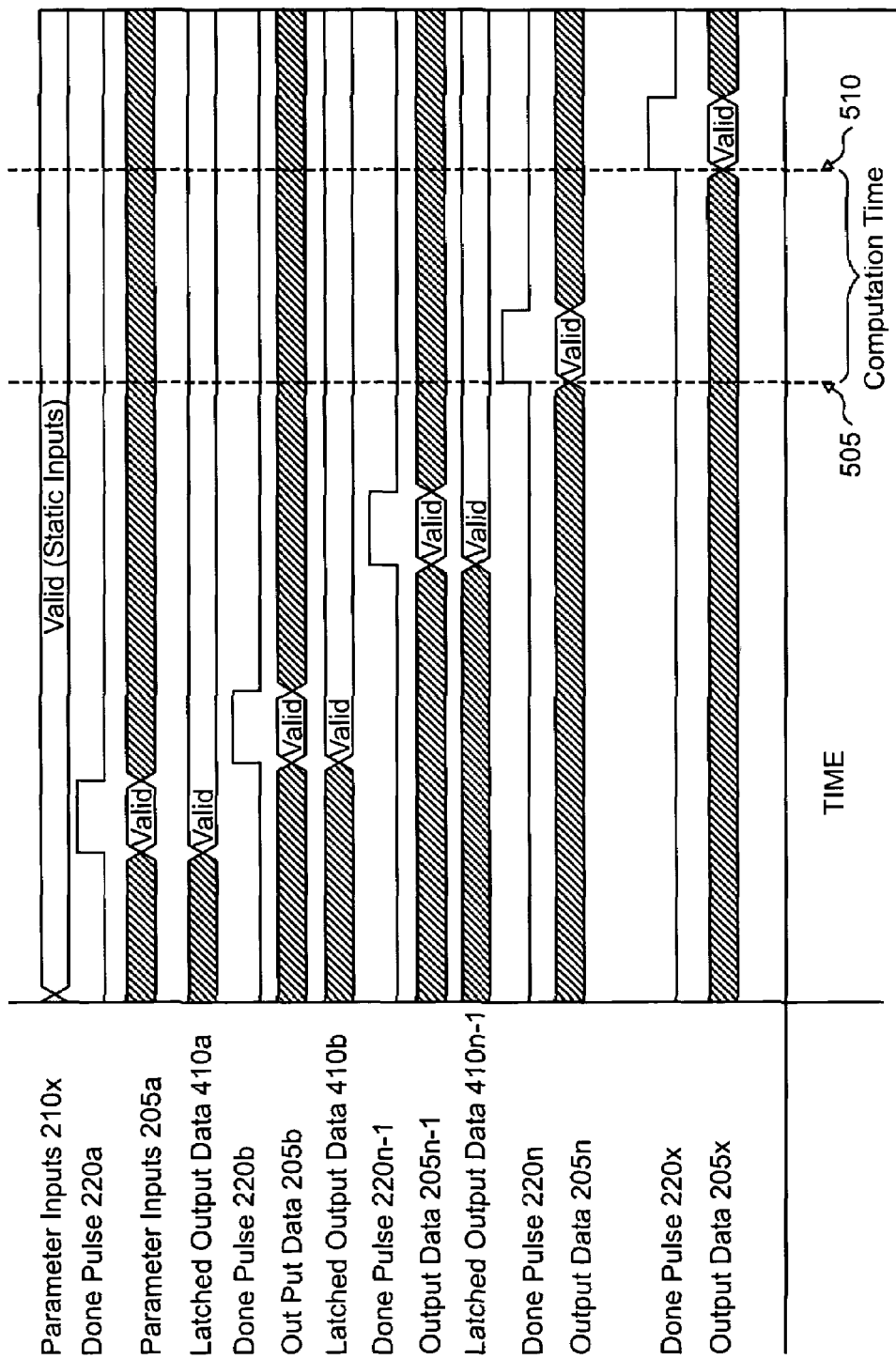
FIG. 5 is a timing diagram showing the operation of the functional block shown in FIG. 4.

Referring now to FIG. 5, there is seen a timing diagram for an exemplary computational cycle of the functional block 105x shown in FIG. 4. As shown in FIG. 5, the latched memory banks 405a, 405b, 405c, . . . , 405n−1 latch the output data 205a, 205b, 205c, . . . , 205n−1 to the latched outputs 405a, 410b, 410c, . . . , 410n−1, so that the computation arrangement 415x receives valid and stable input data at the time the predetermined partial computation is initiated at time 505 by the done pulse 220n. Once the predefined partial computation is completed, the computation arrangement 415x asserts the done pulse 220x and generates valid and stable output data 205x at time 510.

It should be appreciated that, although FIG. 5 shows output data 205a, 205b, 205c, . . . , 205 as valid only for the duration of the associated done pulses 220a, 220b, 220c, . . . , 220n, the output data 205a, 205b, 205c, . . . , 205n may remain valid for a duration exceeding the duration of the associated done pulses 220a, 220b, 220c, . . . , 220n. For example, the output data 205a, 205b, 205c, . . . , 205n may remain valid and stable for the entire duration between consecutive done pulses 220a, 220b, 220c, . . . , 220n, with the associated done pulses 220a, 220b, 220c, . . . , 220n clocking out consecutive output data 205a, 205b, 205c, . . . , 205n. In this manner, the latched memory banks 405a, 405b, 405c, . . . , 405n−1 may be dispensed with, since the output data 205a, 205b, 205c, . . . , 205n−1 will be valid at the time done pulse 220n initiates the predefined partial computation of functional block 105x.

Figure 3:
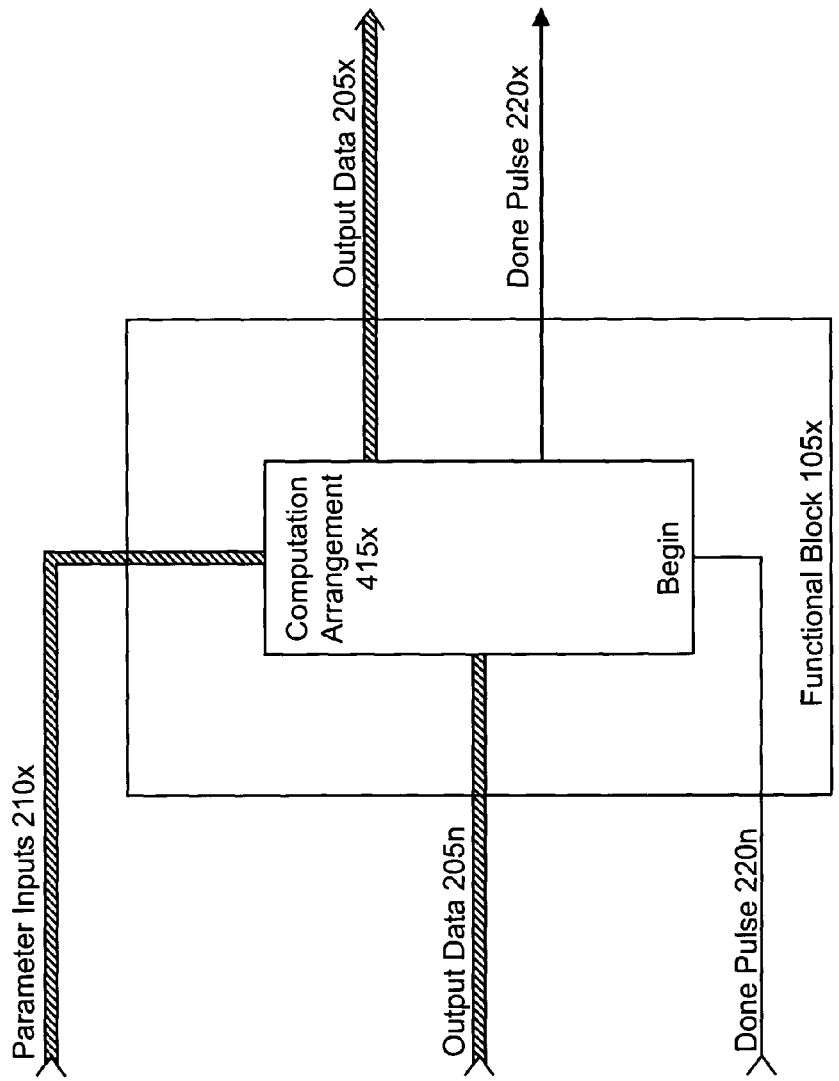
FIG. 3 is a block diagram of another exemplary functional block according to the present invention.

It should also be appreciated that, although FIGS. 2–5 illustrate an exemplary functional block 105 having (n) inputs from functional blocks 105a, 105b, 105c, . . . , 105n, respectively, functional block 105x may receive inputs from only a single functional block 105n, as shown in FIG. 3. In this case, the functional block 105x need not include latched memory banks 405a, 405b, 405c, . . . , 405n−1 for latching output data 205a, 205b, 205c, . . . , 205n−1, and the computational arrangement 415x may initiate the predefined partial computation upon the assertion of the single done pulse 220n.

Figure 6:
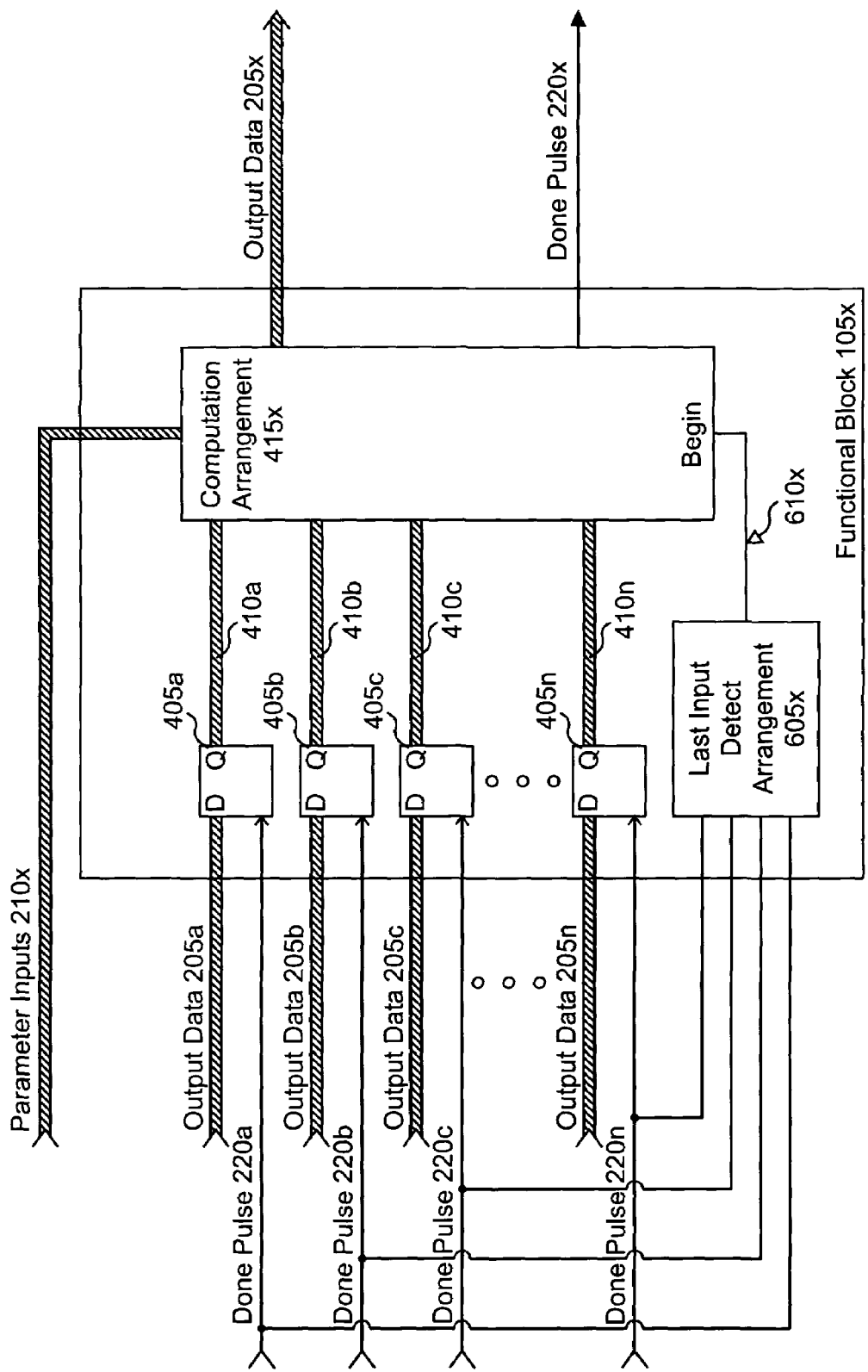
FIG. 6 is a block diagram of still another exemplary functional block according to the present invention.

Referring now to FIG. 6, there is seen a variant of the exemplary functional block 105x of FIG. 2. In this exemplary embodiment, functional block 105x includes a last input detect arrangement 605x configured to detect the last done pulse 220a, 220b, 220c, . . . , 220n to be asserted, and to communicate a signal 610x to cause the computation arrangement 415x to initiate the predetermined partial computation when the last done pulse 220a, 220b, 220c, . . . , 220n is detected. Since the last input detect arrangement 605x automatically detects the last done pulse 220a, 220b, 220c, . . . , 220n to be asserted (i.e., the done pulse of the functional block with the largest latency time), this exemplary variant of the present invention does not require a design engineer to determine the latency time of the nth output data 205n communicated to the functional block 105x, since the computation arrangement 415x does not initiate the predetermined computation until the last done pulse 220a, 220b, 220c, . . . , 220n is detected by the last input detect arrangement 605x.

The exemplary functional blocks of the present invention described above exhibit a "Handshake-on-Terminate" methodology that permits individual functional blocks 105a, 105b, 105c, . . . , 105n to be interconnected in a highly flexible configuration to perform sophisticated and complex calculations rapidly. Each of the functional blocks 105a, 105b, 105c, . . . , 105n is implemented as part of a graphical compiler and assigned various requirements and input/output criteria for accommodation with other blocks. Accordingly, a designer may arbitrarily organize the functional blocks 105a, 105b, 105c, . . . , 105n, and a graphical compiler (not shown) may inform the designer whether specific requirements are met for each block.

Figure 7A:
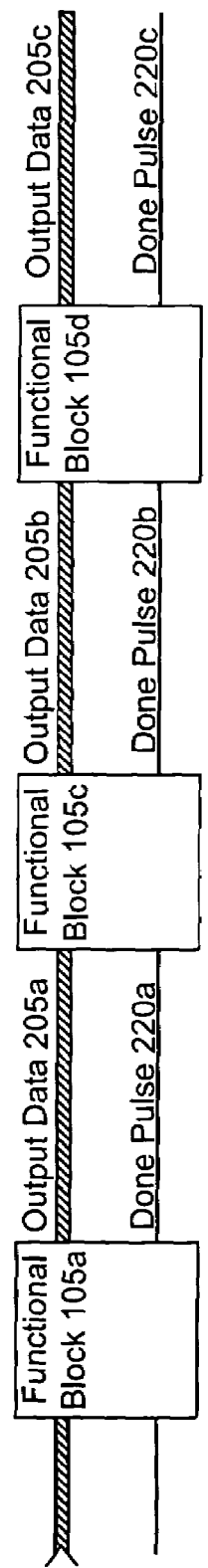
FIG. 7a is a block diagram showing three functional blocks according to the present invention connected in series.
Figure 7B:
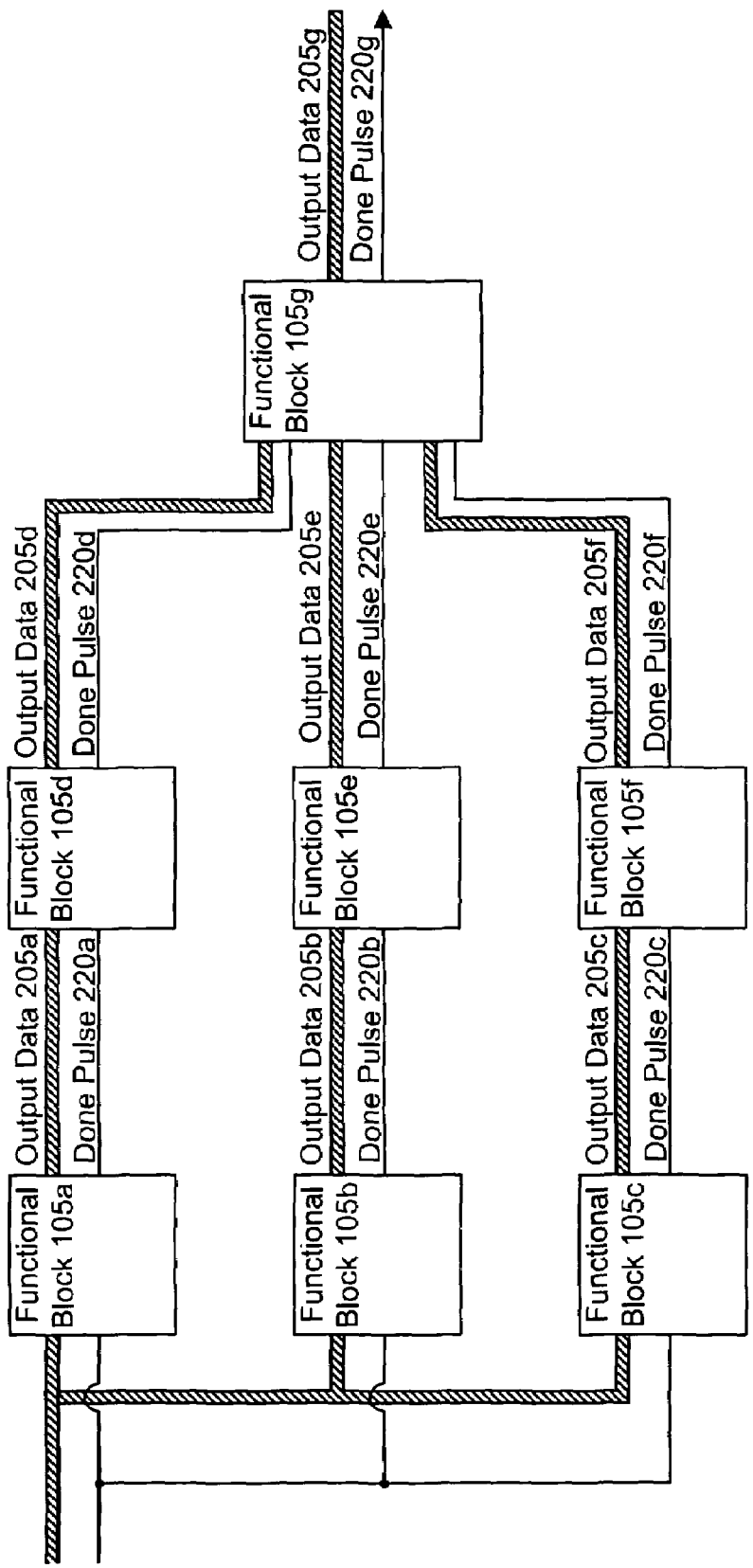
FIG. 7b is a block diagram showing seven functional blocks according to the present invention connected in parallel.

By appropriately organizing the functional blocks 105a, 105b, 105c, . . . , 105n, various module constructions may be created, stored, and reused for appropriate tasks, thereby creating a library of module constructions for use as field oriented components. To create such hierarchical module constructions, functional blocks 105a, 105b, 105c, . . . , 105n may be connected in series, as shown in FIG. 7a and/or in parallel, as shown in FIG. 7b, to exhibit a predefined functionality.

Each of the functional blocks 105a, 105b, 105c, . . . , 105n may also be arranged in a nested configuration, with a given functional block 105x including one or more functional blocks 105a, 105b, 105c, . . . , 105n acting in unison to perform the predetermined partial computation of functional block 105x to generate the output data 205x and the done pulse 220x of the functional block 105x.

Figure 8:
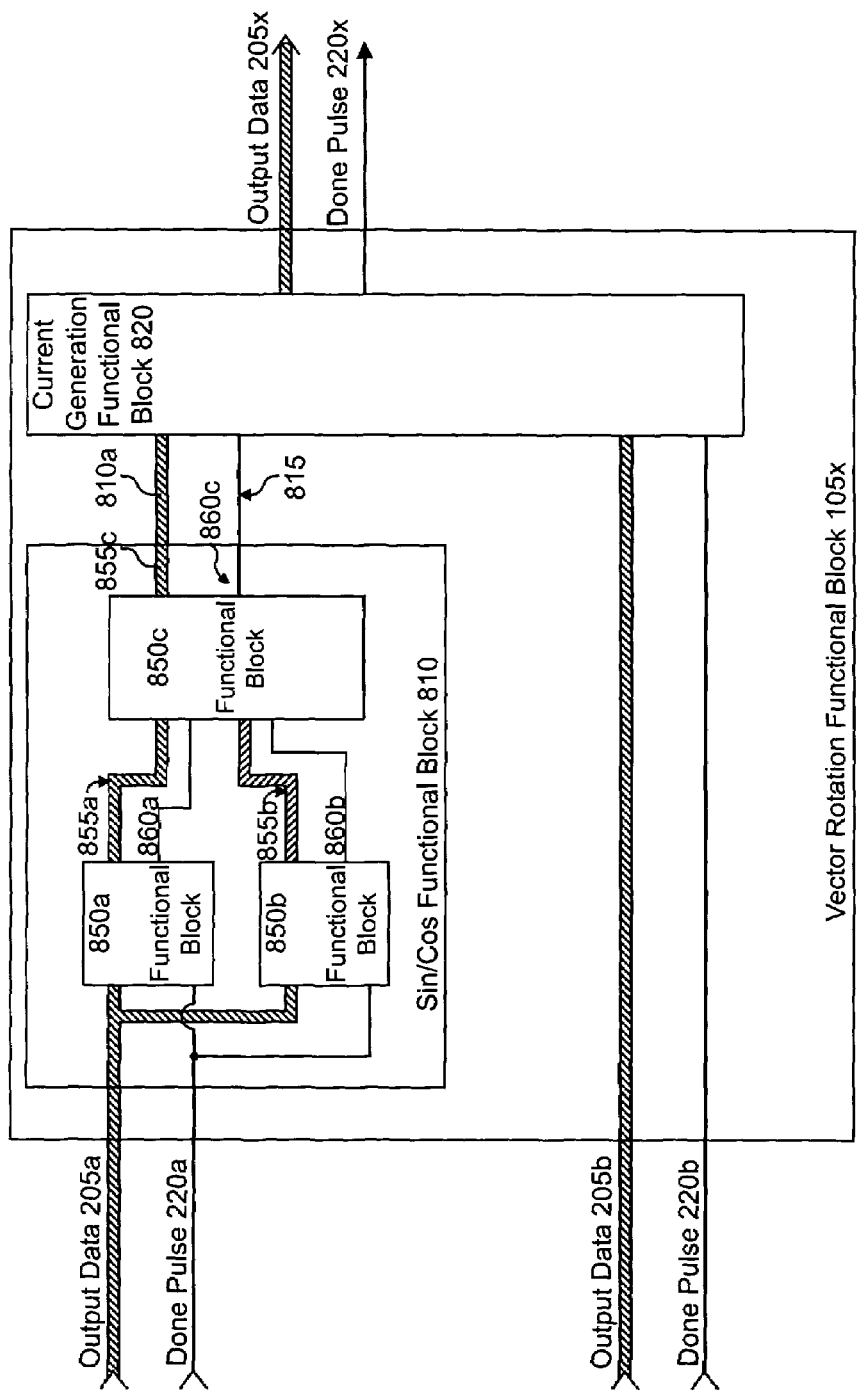
FIG. 8 is a block diagram of yet another exemplary functional block including additional nested functional blocks according to the present invention.
Figure 9:
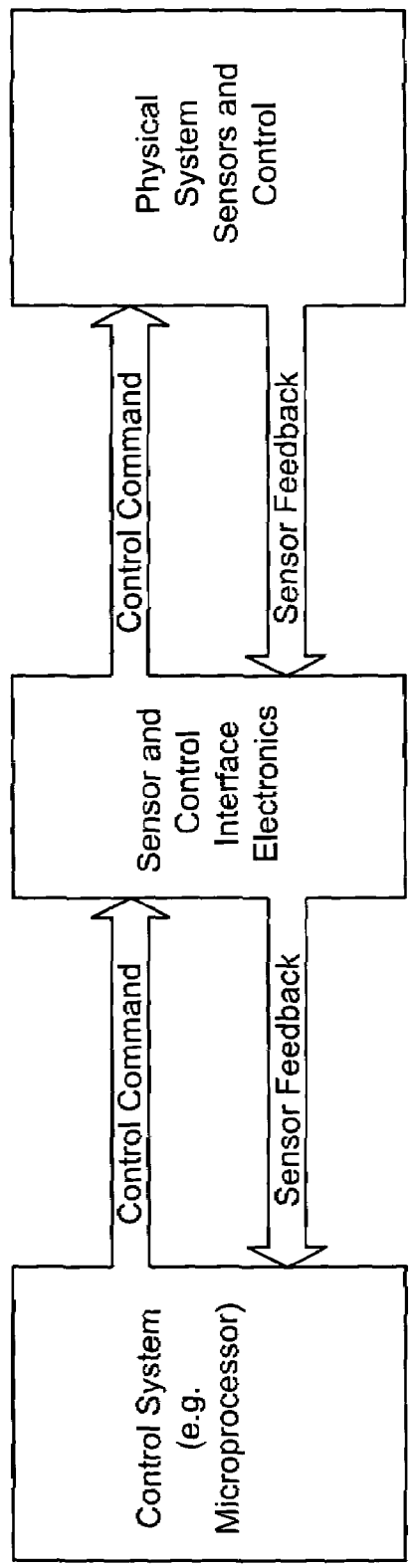
FIG. 9 is a block diagram showing a conventional control system according to the prior art.

Referring now to FIG. 8, there is seen an exemplary vector rotation functional block 105x according to the present invention, including sub-blocks arranged in a nested configuration. Vector rotation functional block 105x is configured to perform a predefined partial computation in accordance with output data 205a, 205b communicated from external functional blocks 105a, 105b (not shown). After completing the predetermined computation, the vector rotation functional block 105x generates output data 205x (e.g., current outputs Iq, Id) and an associated done pulse 220x, in accordance with the "Handshake-on-Terminate" methodology described above.

To perform the predetermined computation, vector rotation functional block 105x includes two nested "Handshake-on-Terminate" functional blocks: a sin/cos functional block 810; and a current generation functional block 820 communicatively coupled to the sin/cos functional block 810.

The sin/cos functional block 810 receives output data 205a and done pulse 220a from functional block 105a (not shown), and produces sine and cosine quadrature signals 810a as a function of the output data 205a. In accordance with the "Handshake-on-Terminate" methodology, the sin/cos functional block 810 also generates an associated done pulse 815 when the sin/cos functional block 810 finishes computing the sine and cosine quadrature signals 810a.

The current generation functional block 820 is configured to generate the output data 205x and the associated done pulse 220x of vector rotation functional block 105x. For this purpose, current generation functional block 820 receives the sine and cosine quadrature signals 810a and done pulse 815 from the sin/cos functional block 810, as well as the output data 205b and done pulse 220b from functional block 105b (not shown). In accordance with the "Handshake-on-Terminate" methodology according to the present invention, the current generation functional block 820 generates the output data 205x and the associated done pulse 220x as a function of the sine and cosine-quadrature signals 810a and the output data 205b.

To compute the sine and cosine quadrature signals 810a, the sin/cos functional block 810 includes three nested functional blocks 850a, 850b, 850c connected in accordance with the "handshake-on-terminate" methodology. Nested functional blocks 850a, 850b each receive the output data 205a and the done pulse 220a from functional block 105a (not shown) and produce respective output data 855a, 855b and respective done pulses 860a, 860b to indicate the completion of predetermined computations assigned to functional blocks 850a, 850b, respectively. The output data 855a, 855b and the done pulses 860a, 860b are provided to functional block 850c, which generates output data 855c and done pulse 860c in accordance with the "Handshake-on-Terminate" methodology. The output data 855c and done pulse 860c are then provided as the sine and cosine quadrature signals 810a and done pulse 815, respectively, of the sin/cos functional block 810.

Although the exemplary vector rotation functional block 105x of FIG. 8 does not receive parameter inputs 210x, it should be appreciated that the functional block 105x, including any or all of its nested functional blocks 850a, 850b, 850c, 810, 820, may receive parameter inputs 210x, which may or may not consist of static signals communicated, for example, by the master controller 150.

Figure 10:
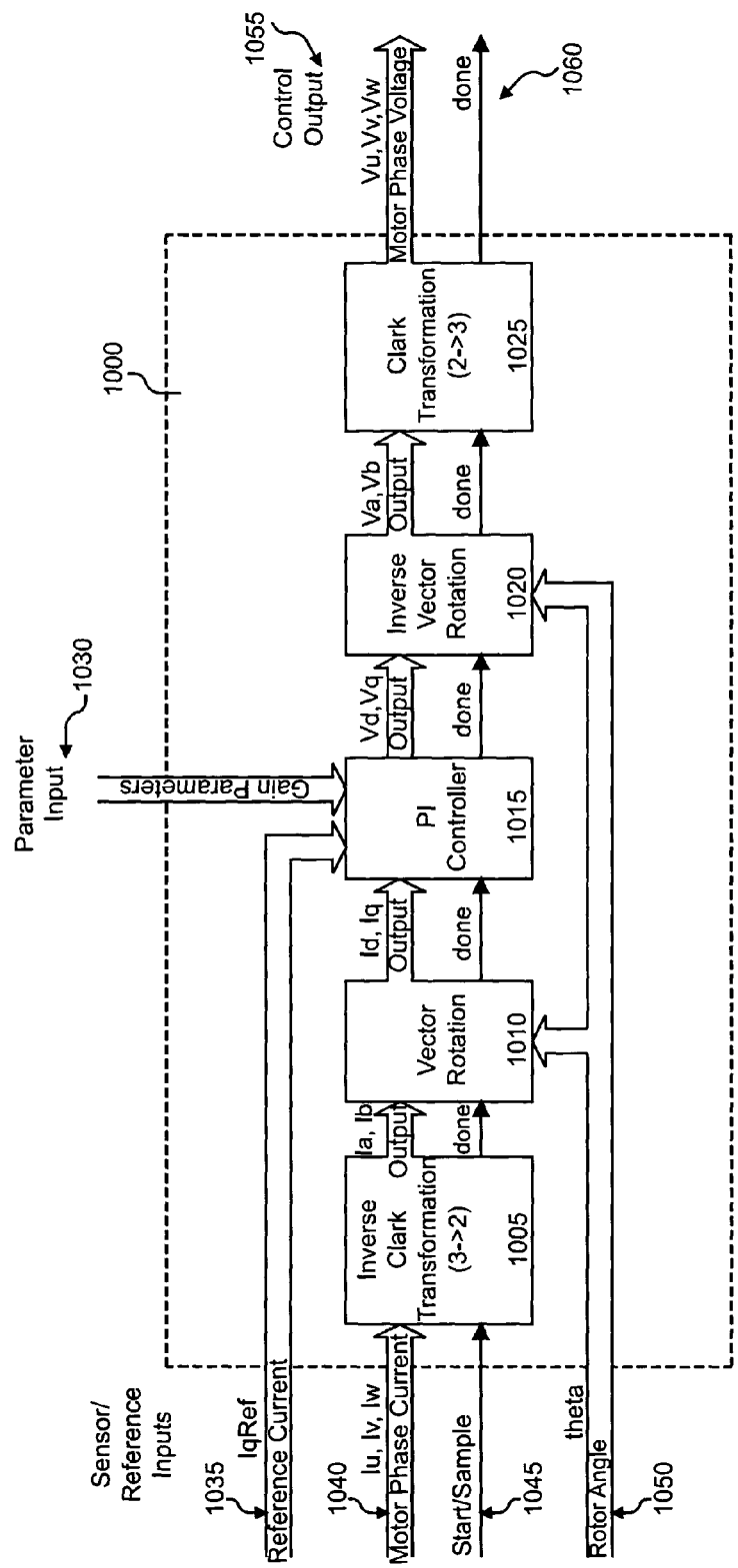
FIG. 10 is a block diagram of an electronic control system according to the present invention for controlling the torque of an AC motor.

Referring now to FIG. 10, there is seen another exemplary electronic control system as a field oriented control system 1000 for controlling the torque of an AC motor (not shown) by producing control output 1055 (i.e., motor phase voltages Vu, Vv, and Vw) in accordance with a reference current 1035 (i.e., IqRef), motor phase currents 1040 (i.e., Iu, Iv, Iw), parameter inputs 1030, and a rotor angle 1050 (i.e., theta).

The control system 1000 includes a plurality of functional blocks serially connected in accordance with the "Handshake-on-Terminate" methodology of the present invention. Specifically, the control system 1000 includes an inverse Clark transformation functional block 1005, a vector rotation functional block 1010 communicatively coupled to the Inverse Clark Transformation functional block 1005, a PI controller 1015 communicatively coupled to the vector rotation functional block 1010, an inverse vector rotation functional block 1020 communicatively coupled to the PI controller 1015, and a Clark transformation functional block 1025 communicatively coupled to the inverse vector rotation functional block 1020.

The PI controller 1015 is configured to control Q-axis current in the synchronous or rotating frame so that the input reference current may be tracked. The PI controller 1015 samples reference current 1035, motor current 1040, and motor angle 1050 simultaneously at the beginning of the sample period, performs motor voltage calculations, and outputs a new motor voltage command at the end of the sample period.

Figure 11:
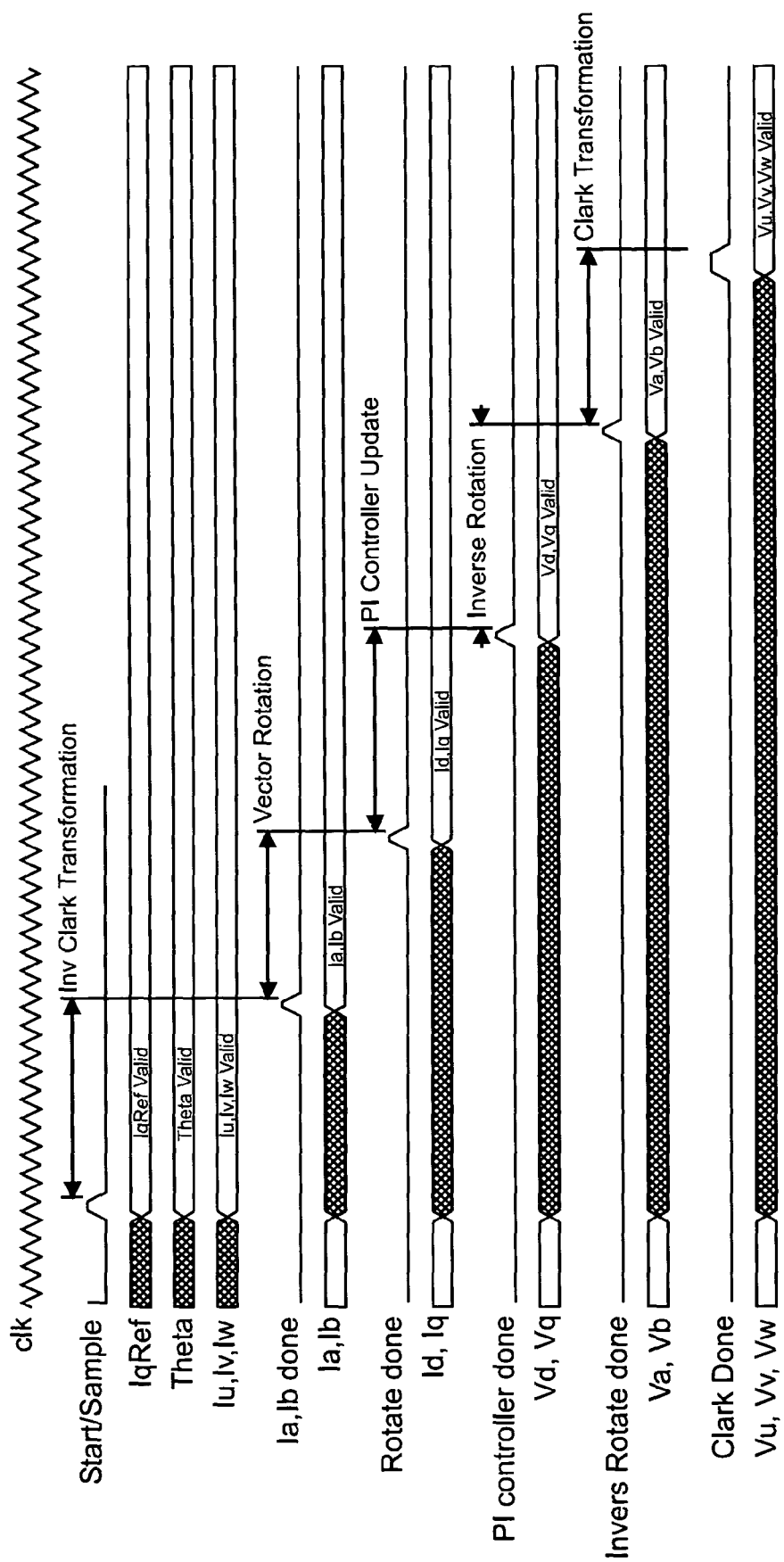
FIG. 11 is a timing diagram showing the operation of the electronic control system of FIG. 10.

To initiate the sample period, the start/sample pulse 1045 is asserted to the control system 1000, thereby causing a cascaded computation to be performed by the functional blocks of the system 1000 in accordance with the "Handshake-on-Terminate" methodology of the present invention. FIG. 11 shows a timing diagram of the field oriented control system 1000 after the assertion of the start/sample pulse 1045.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electronic control system, comprising:
   a device to be controlled;
   an application control arrangement including a plurality of functional blocks configured to perform a cascaded computation, the application control arrangement configured to generate control signals to control the device in accordance with the cascaded computation; and
   a master control arrangement communicatively coupled to the application control arrangement and configured to communicate parameter inputs and an initial start pulse to the application control arrangement, the initial start pulse being operable to initiate the cascaded computation; wherein
   each of the functional blocks is configured to generate output data and a done pulse in accordance with a predetermined partial computation, the output data being valid and stable at least for a duration of the done pulse, the predetermined partial computation of each of the functional blocks being performed as a function of input data and an input done pulse communicated by at least one input functional block, the predetermined partial computation being initiated by the input done pulse.

2. The electronic control system according to claim 1, wherein the device to be controlled includes one of an AC and a DC motor.

3. The electronic control system according to claim 2, wherein the control signals include at least one of current signals and voltage signals, at least one of a speed and a torque being controlled in accordance with the control signals.

4. The electronic control system according to claim 1, wherein the predetermined computation of at least one of the functional blocks is performed as a function of at least a portion of the parameter inputs.

5. The electronic control system according to claim 1, wherein at least some of the functional blocks are connected in series.

6. The electronic control system according to claim 1, wherein at least some of the functional blocks are connected in parallel.

7. The electronic control system according to claim 1, wherein at least one of the functional blocks includes a plurality of nested functional blocks configured to perform the predetermined partial computation.

8. An electronic control system, comprising:
   a device to be controlled;
   an application control arrangement including a plurality of functional blocks configured to perform a cascaded computation, the application control arrangement configured to generate control signals to control the device in accordance with the cascaded computation; and
   a master control arrangement communicatively coupled to the application control arrangement and configured to communicate parameter inputs and an initial start pulse to the application control arrangement, the initial start pulse being operable to initiate the cascaded computation; wherein
   each of the functional blocks is configured to generate output data and a done pulse in accordance with a predetermined partial computation, the output data being valid and stable at least for a duration of the done pulse, the predetermined partial computation of each of the functional blocks being performed as a function of input data and an input done pulse communicated by at least one input functional block, the predetermined partial computation being initiated by the input done pulse; and
   wherein at least one of the functional blocks includes at least one latched memory bank respectively assigned to the input data and the input done pulse communicated by the at least one input functional block, and the at least one functional block further includes a computation arrangement communicatively coupled to the latched memory bank, the latched memory bank being configured to generate latched input data and to communicate the latched input data to the computation arrangement, the computation arrangement being configured to perform the predetermined partial computation in accordance with the latched input data.

9. An electronic control system, comprising:
   a device to be controlled;
   an application control arrangement including a plurality of functional blocks configured to perform a cascaded computation, the application control arrangement configured to generate control signals to control the device in accordance with the cascaded computation; and
   a master control arrangement communicatively coupled to the application control arrangement and configured to communicate parameter inputs and an initial start pulse to the application control arrangement, the initial start pulse being operable to initiate the cascaded computation;
   wherein each of the functional blocks is configured to generate output data and a done pulse in accordance with a predetermined partial computation, the output data being valid and stable at least for a duration of the done pulse, the predetermined partial computation of each of the functional blocks being performed as a function of input data and an input done pulse communicated by at least one input functional block, the predetermined partial computation being initiated by the input done pulse;
   wherein at least one of the functional blocks includes at least one latched memory bank respectively assigned to the input data and the input done pulse communicated by the at least one input functional block, and the at least one functional block further includes a computation arrangement communicatively coupled to the latched memory bank, the latched memory bank being configured to generate latched input data and to communicate the latched input data to the computation arrangement, the computation arrangement being configured to perform the predetermined partial computation in accordance with the latched input data; and
   wherein the at least one functional block further includes a pulse detect arrangement configured to detect a last one of the input done pulses, the last done pulse being operable to initiate the predetermined partial computation.

10. A functional block of an application control arrangement of an electronic control system, the functional block generating output data and a done pulse, the functional block comprising:
    a computation arrangement configured to perform a predetermined partial computation in accordance with input data and an input done pulse communicated by at least one input functional block; wherein
    the computation arrangement is further configured to generate the output data and the done pulse in accordance with the predetermined partial computation, the output data being valid and stable at least for a duration of the done pulse, the predetermined partial computation being initiated by the input done pulse.

11. The functional block according to claim 10, wherein the computation arrangement includes a plurality of nested functional blocks configured to perform the predetermined partial computation.

12. A functional block of an application control arrangement of an electronic control system, the functional block generating output data and a done pulse, the functional block comprising:
    a computation arrangement configured to perform a predetermined partial computation in accordance with input data and an input done pulse communicated by at least one input functional block; wherein
    the computation arrangement is further configured to generate the output data and the done pulse in accordance with the predetermined partial computation, the output data being valid and stable at least for a duration of the done pulse, the predetermined partial computation being initiated by the input done pulse; and
    at least one latched memory bank respectively assigned to the input data and the input done pulse communicated by the at least one input functional block; wherein
    the computation arrangement is communicatively coupled to the latched memory bank, the latched memory bank being configured to generate latched input data and to communicate the latched input data to the computation arrangement, the computation arrangement being configured to perform the predetermined partial computation in accordance with the latched input data.

13. A functional block of an application control arrangement of an electronic control system, the functional block generating output data and a done pulse, the functional block comprising:
- a computation arrangement configured to perform a predetermined partial computation in accordance with input data and an input done pulse communicated by at least one input functional block, wherein the computation arrangement is further configured to generate the output data and the done pulse in accordance with the predetermined partial computation, the output data being valid and stable at least for a duration of the done pulse, the predetermined partial computation being initiated by the input done pulse;
- at least one latched memory bank respectively assigned to the input data and the input done pulse communicated by the at least one input functional block, wherein the computation arrangement is communicatively coupled to the latched memory bank, the latched memory bank being configured to generate latched input data and to communicate the latched input data to the computation arrangement, the computation arrangement being configured to perform the predetermined partial computation in accordance with the latched input data; and
- a pulse detect arrangement configured to detect a last one of the input done pulses, the last done pulse being operable to initiate the predetermine partial computation.

14. A method of providing electronic control of a device to be controlled, the method comprising:
- providing the device to be controlled;
- providing an application control arrangement including a plurality of functional blocks configured to perform a cascaded computation, the application control arrangement configured to generate control signals to control the device in accordance with the cascaded computation; and
- providing a master control arrangement communicatively coupled to the application control arrangement and configured to communicate parameter inputs and an initial start pulse to the application control arrangement, the initial start pulse being operable to initiate the cascaded computation; wherein
- each of the functional blocks is configured to generate output data and a done pulse in accordance with a predetermined partial computation, the output data being valid and stable at least for a duration of the done pulse, the predetermined partial computation of each of the functional blocks being performed as a function of input data and an input done pulse communicated by at least one input functional block, the predetermined partial computation being initiated by the input done pulse.

* * * * *